United States Patent
Verdun

(10) Patent No.: US 9,274,584 B2
(45) Date of Patent: *Mar. 1, 2016

(54) PROCESSOR PERFORMANCE STATE OPTIMIZATION

(75) Inventor: Gary Joseph Verdun, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 886 days.

This patent is subject to a terminal disclaimer.

(21) Appl. No.: 13/178,154

(22) Filed: Jul. 7, 2011

(65) Prior Publication Data

US 2011/0271124 A1 Nov. 3, 2011

Related U.S. Application Data

(63) Continuation of application No. 12/025,839, filed on Feb. 5, 2008, now Pat. No. 7,992,015.

(51) Int. Cl.
G06F 1/26 (2006.01)
G06F 1/32 (2006.01)

(52) U.S. Cl.
CPC ............ *G06F 1/3203* (2013.01); *G06F 1/3296* (2013.01); *Y02B 60/1285* (2013.01)

(58) Field of Classification Search
CPC ................................ G06F 1/3203; G06F 1/26
USPC .......................................................... 713/300
See application file for complete search history.

(56) References Cited

U.S. PATENT DOCUMENTS

| | | | |
|---|---|---|---|
| 5,632,038 A | 5/1997 | Fuller | |
| 5,692,201 A | 11/1997 | Yato | |
| 5,778,237 A * | 7/1998 | Yamamoto et al. | 713/322 |
| 6,118,306 A * | 9/2000 | Orton et al. | 327/44 |
| 6,766,460 B1 * | 7/2004 | Evoy et al. | 713/323 |
| 6,795,927 B1 | 9/2004 | Altmejd et al. | |
| 7,032,116 B2 | 4/2006 | Cooper | |
| 7,174,469 B2 | 2/2007 | Luick | |
| 7,197,652 B2 | 3/2007 | Keller, Jr. et al. | |
| 7,219,241 B2 | 5/2007 | Cooper et al. | |
| 7,240,223 B2 | 7/2007 | De Cesare et al. | |
| 7,281,140 B2 | 10/2007 | Burns et al. | |
| 7,281,149 B2 | 10/2007 | Atkinson | |
| 7,346,791 B2 | 3/2008 | Kato et al. | |
| 7,441,129 B2 | 10/2008 | Lougee | |
| 7,529,948 B2 | 5/2009 | Conroy et al. | |
| 7,788,508 B1 * | 8/2010 | Salmi et al. | 713/300 |
| 8,051,320 B2 * | 11/2011 | Knoth | 713/503 |
| 2004/0139361 A1 * | 7/2004 | Flynn | 713/320 |
| 2004/0163000 A1 | 8/2004 | Kuhlmann et al. | |
| 2005/0125702 A1 | 6/2005 | Huang et al. | |
| 2005/0138442 A1 | 6/2005 | Keller et al. | |

(Continued)

*Primary Examiner* — Kim Huynh
*Assistant Examiner* — Eric Chang
(74) *Attorney, Agent, or Firm* — Haynes and Boone, LLP

(57) ABSTRACT

A processor performance state optimization includes a system to change a performance state of a processor. In an embodiment, the system to change a performance state of the processor includes a processor and a step logic sub-system operatively coupled with the processor and is operable to communicate a performance state change request to the processor. A core voltage regulator is operatively coupled with the step logic sub-system. An end performance state sub-system to determine a desired end performance state is coupled with the step logic sub-system. And, an enable sub-state transition sub-system to enable sub-state transitions is coupled with the step logic sub-system.

19 Claims, 3 Drawing Sheets

(56) References Cited

U.S. PATENT DOCUMENTS

| | | |
|---|---|---|
| 2005/0268141 A1 | 12/2005 | Alben et al. |
| 2006/0069938 A1 | 3/2006 | Olszewski et al. |
| 2006/0265616 A1 | 11/2006 | Cesare et al. |
| 2007/0162776 A1 | 7/2007 | Carpenter et al. |

\* cited by examiner

PROCESSOR PERFORMANCE STATE OPTIMIZATION

CROSS REFERENCE TO RELATED APPLICATIONS

The present application claims priority to and is a continuation of co-owned, co-pending U.S. patent application Ser. No. 12/025,839, filed Feb. 5, 2008, and is related to U.S. patent application Ser. No. 13/178,111 filed Jul. 7, 2011, the disclosures of which are incorporated herein by reference.

BACKGROUND

The present disclosure relates generally to information handling systems (IHSs), and more particularly to IHS processor performance state optimization.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are generally understood in the art to operate using a processor to process information. Current processor control algorithms have been found through experimentation when running bursty applications to give higher performance and lower power consumption when using minimum and maximum performance states and transitioning between the two. A processor may process information by running as fast as possible to get a piece of work done and then sleeping the system until the next piece of work arrives. Traditionally, processors begin running at a lowest performance state and let the voltage continue to slew to a voltage required by the intended performance state and then transition the operating frequency once this occurs. However, with a processor having many performance states, the processor spends a large amount of time at the lowest speed with much higher voltages than required for the given operating frequency. This results in a power penalty for the performance of the processor obtained at the low operating frequency.

Accordingly, it would be desirable to provide improved processor performance state optimization absent the deficiencies described above.

SUMMARY

According to one embodiment, a system to change a performance state of a processor includes a processor and a step logic sub-system operatively coupled with the processor and is operable to communicate a performance state change request to the processor. A core voltage regulator is operatively coupled with the step logic sub-system. An end performance state sub-system to determine a desired end performance state is coupled with the step logic sub-system. And, an enable sub-state transition sub-system to enable sub-state transitions is coupled with the step logic sub-system.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
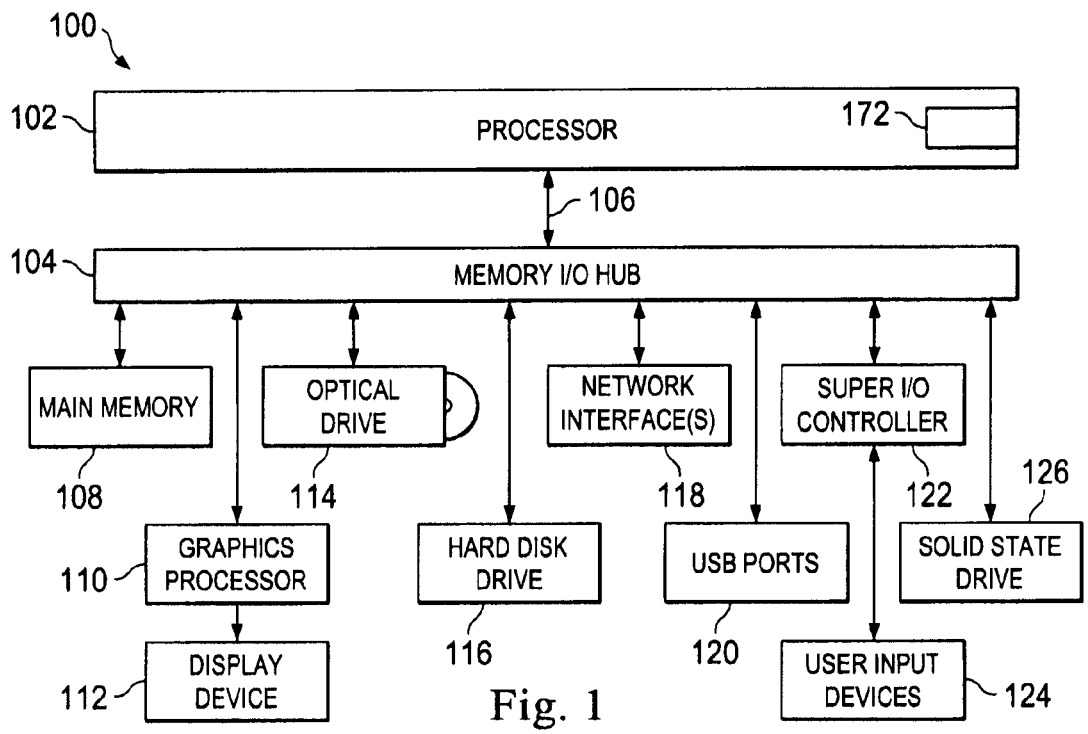
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

The advanced configuration and power interface (ACPI) performance states are commonly used as processor 102 and other device performance standards and are commonly understood by those having ordinary skill in the art. ACPI specification is an open industry standard that defines common interfaces for hardware recognition, motherboard and device configuration and power management. Using ACPI, an operating system (OS) for an IHS is generally in control of the power management of the IHS. As is also commonly understood by those having ordinary skill in the art, processor 102 power states are generally know as C0 (operating state), C1 (halt), C2 (stop-clock), and C3 (sleep). Performance states for the processor 102 and other devices are generally implementation-dependent, where P0 is the highest performance state, with P1 to Pn being successively lower-performance states. Power consumption in semiconductor type devices equals a switching function (Voltage$^2$·frequency·capacitance·constant) plus a leakage function (Voltage$^2$/Resistance). Therefore, it follows that changing both voltage and frequency of operation for the processor yields exponential changes in power consumption for the device (e.g., a processor 102). It is generally understood that there is a minimum operating frequency for the semiconductor device for a given voltage.

Figure 2:
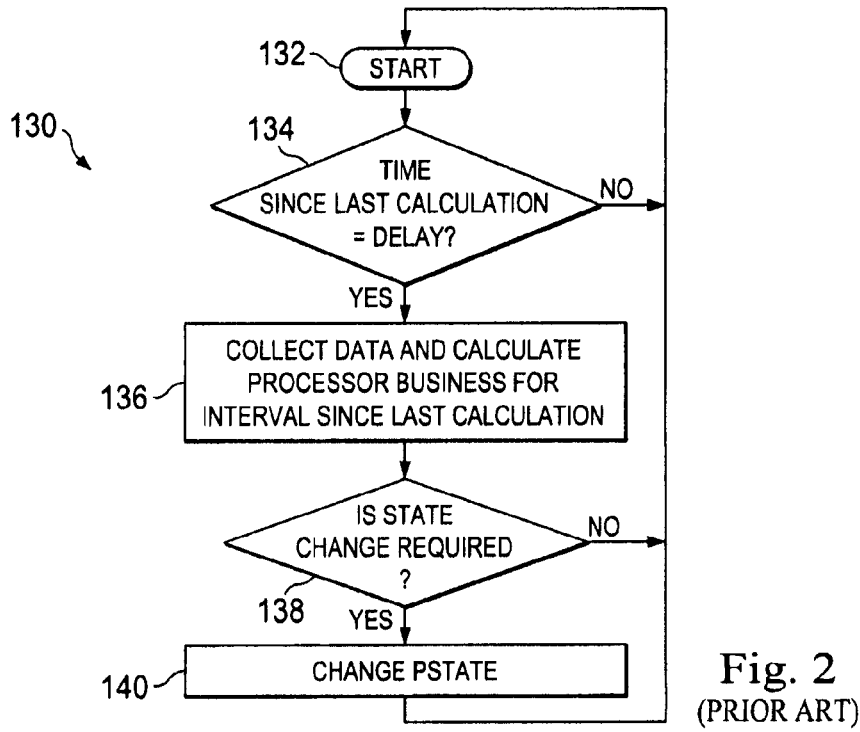
FIG. 2 illustrates a prior art embodiment of a processor performance state change method.

FIG. 2 illustrates a prior art embodiment of a processor 102 performance state change method 130. The method 130 begins at block 132 where the processor is presently in one of several available performance states. The method 130 proceeds to decision block 132 where the method 130 determines whether a time since the last processor 102 calculation equals a pre-determined time delay. If no, the time since the last processor 102 calculation does not equal a pre-determined time delay, the method 130 returns to block 132. If yes, the time since the last processor 102 calculation does equal a pre-determined time delay, the method 130 proceeds to block 136 where the method 130 collects data and calculates processor business for the interval time since the last calculation. The method 130 then proceeds to decision block 138 where the method 130 determines whether a performance state change is required. If no, no performance state change is required, the method 130 returns to block 132. If yes, a performance state change is required, the method 130 proceeds to block 140 where the method 130 changes the performance state of the processor 102. The method 130 then returns to block 132 and starts over.

Figure 3:
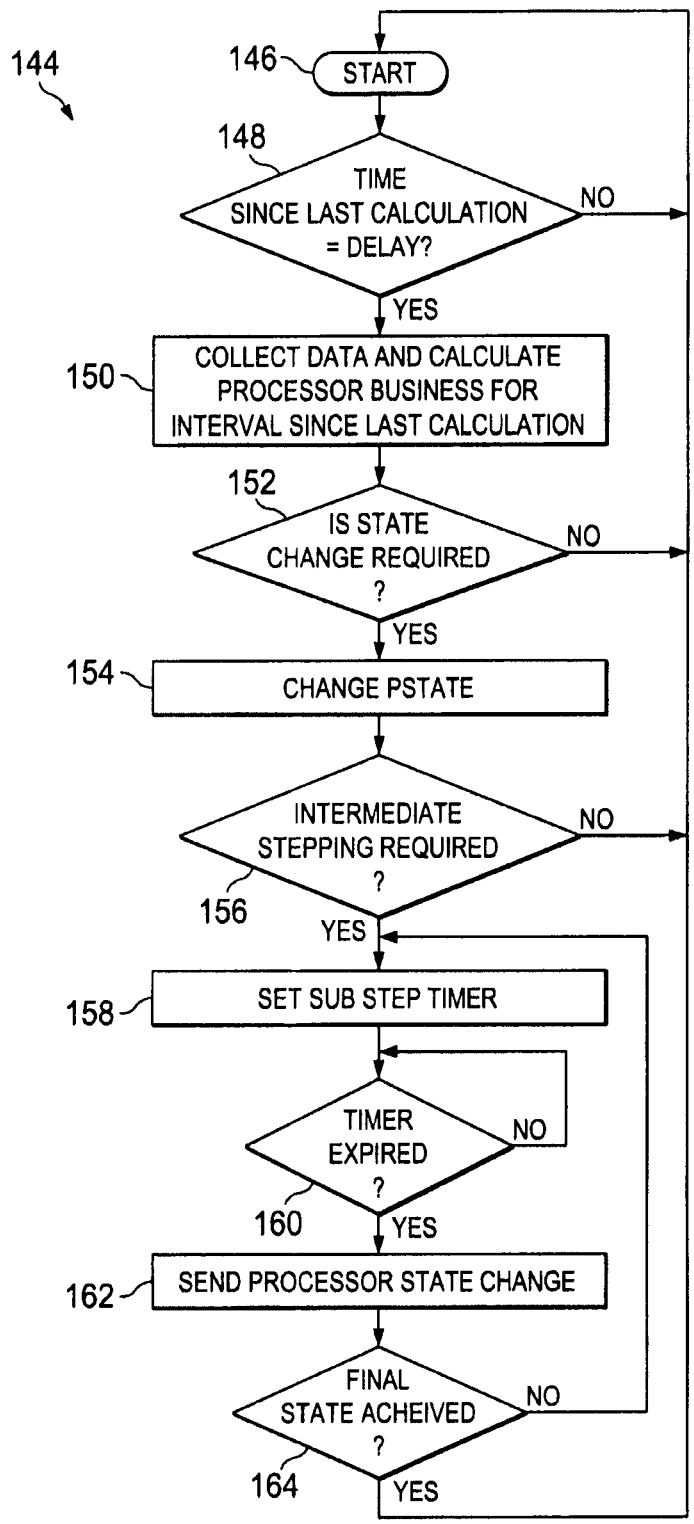
FIG. 3 illustrates an embodiment of an optimized processor performance state change method.

FIG. 3 illustrates an embodiment of an optimized processor performance state change method 144. The method 144 begins at block 146 where the processor 102 is presently in one of several available performance states. The method 144 proceeds to decision block 148 where the method 144 determines whether a time since the last processor 102 calculation equals a pre-determined time delay. If no, the time since the last processor 102 calculation does not equal a pre-determined time delay, the method 144 returns to block 146. If yes, the time since the last processor 102 calculation does equal a pre-determined time delay, the method 144 proceeds to block 150 where the method 144 collects data and calculates processor business for the interval time since the last calculation. The method 144 then proceeds to decision block 152 where the method 144 determines whether a performance state change is required. If no, no performance state change is required, the method 144 returns to block 146. If yes, a performance state change is required, the method 144 proceeds to block 154 where the method 144 changes the performance state of the processor 102. The method 144 then proceeds to decision block 156 where the method 144 determines whether intermediate stepping of voltage and/or frequency between pre-determined performance states levels is required. If no, the method 144 returns to block 146. If yes, intermediate stepping is required, the method 144 proceeds to block 158 where the method 144 sets a sub-step timer. The method 144 then proceeds to decision block 160 where the method 144 determines whether the sub-step timer has expired. If no, the method 144 returns to decision block 160. If yes, the sub-step timer has expired, the method 144 proceeds to block 162 where the method 144 sends a processor state change request. The method 144 then proceeds to decision block 164 where the method 144 determines whether the desired performance state has been achieved. If no, the method 144 returns to block 158. If yes, the desired performance state has been achieved, the method returns to block 146 and starts over.

Figure 4:
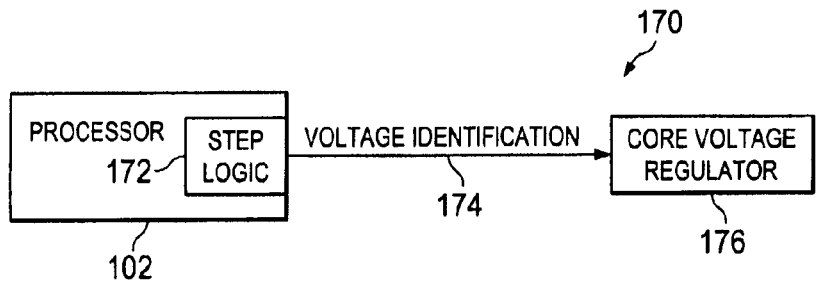
FIG. 4 illustrates a logic block diagram for an embodiment of a sub state change system internal to processor.

FIG. 4 illustrates a logic block diagram for an embodiment of a sub state change system 170 internal to the processor 102. In this system 170, the processor 102 includes a step logic system 172 for reviewing a pre-loaded performance ramp table and determining when performance state changes and performance sub-state changes are desirable and initiating such changes. The step logic system 172 communicates a voltage identification 174 to a core voltage regulator 176. Therefore, the step logic system 172 informs the core voltage regulator 176 of the desired voltage for the processor 102 core. When informed of the desired voltage level for the processor 102 core, the core voltage regulator 176 may regulate the processor 102 core operating voltage. It is generally understood that changing the core voltage level requires a slew time for the voltage to change to a new desired level. Therefore, changing a voltage level may be performed before changing a frequency level when changing performance states allowing the voltage to sloop to the desired level before the frequency is changed. This keeps the processor 102 operating above a minimum core voltage operating level.

Figure 5:
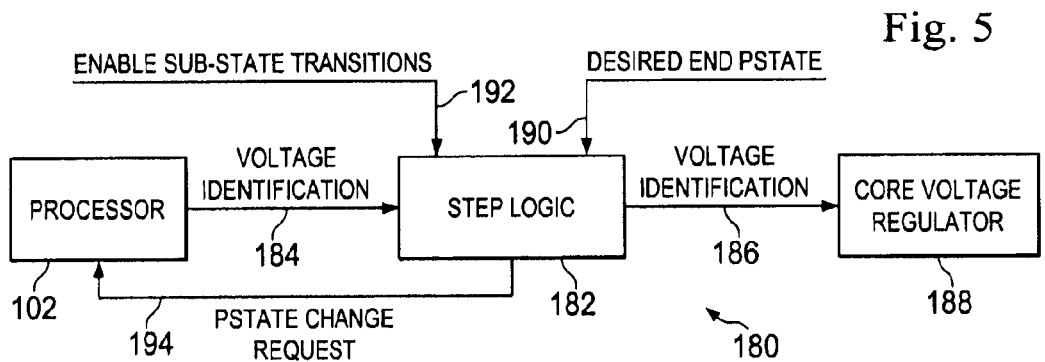
FIG. 5 illustrates a logic block diagram for an embodiment of a sub state change system external to processor.

FIG. 5 illustrates a logic block diagram for an embodiment of a sub state change system 180 external to processor 102. In this system 180, the processor 102 couples with an external step logic system 182 for reviewing a pre-loaded performance ramp table and determining when performance state changes and performance sub-state changes are desirable and initiating such changes. The step logic system 182 receives a voltage identification 184 from the processor. The step logic system 182 communicates a voltage identification 186 to a core voltage regulator 188. Therefore, the step logic system 182 informs the core voltage regulator 188 of the desired voltage for the processor 102 core. When informed of the desired voltage level for the processor 102 core, the core voltage regulator 188 may regulate the processor 102 core operating voltage. The step logic 182 receives a desired end performance state input 190 informing the step logic 182 of a desired end performance state for the processor 102. The step logic 182 may use the desired end performance state input 190 to determine how to perform intermediate steps for voltage and/or frequency between defined performance states. The step logic 182 also receives an enable sub state transition input informing the step logic 182 if sub state transitions are available for the processor 102. The step logic 182 uses the voltage identification input 184, the desired end performance state input 190, and/or the enable sub state transitions input 192 to determine if and how intermediate steps should be taken in voltage and/or frequency between the performance states and communicates outputs of a voltage identification 186 and a performance state change request 194 to the core voltage regulator 188 and the processor 102 respectively.

Figure 6:
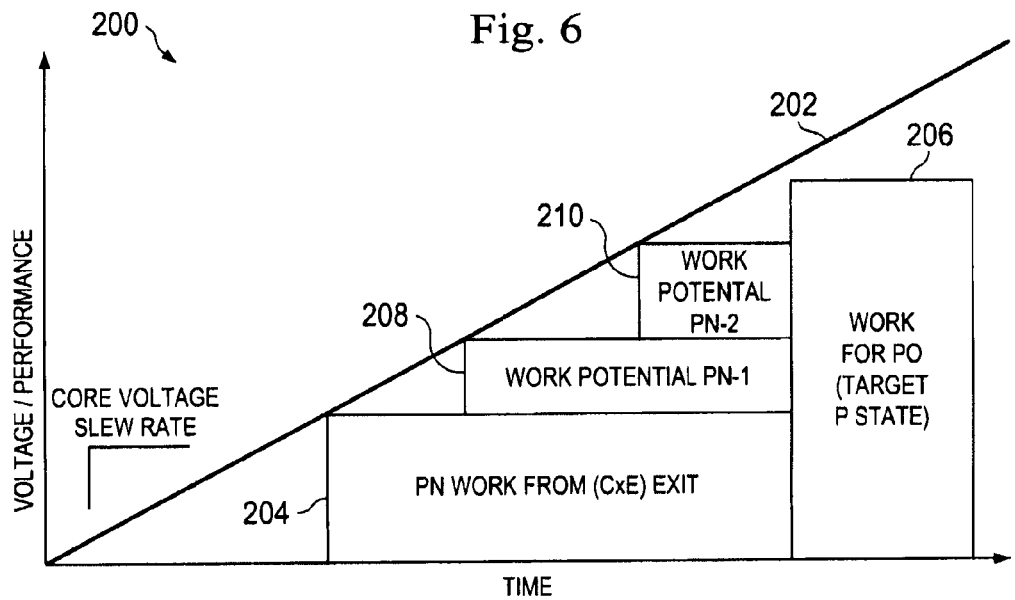
FIG. 6 illustrates an embodiment of a transition diagram showing work potential between performance states.

FIG. 6 illustrates an embodiment of a transition diagram 200 showing work potential between performance states along a processor 102 core operating level 202. An existing performance state Pn 204 is shown. A desired or target performance state P0 206 is also shown. This diagram 200 shows that one or more work potential states Pn-1 208, Pn-2 210 exist between the performance states 204, 206 along the operating level 202.

Referring to FIGS. 4, 5, and 6, both of the systems 170, 180 should be initialized with a set of voltages for supported performance states. During transition from one performance state to another performance state, the systems 170, 180 would know a desired final performance state. Combining this knowledge with a preloaded supported performance state table would allow the systems 170, 180 to initiate sub-state changes along the ramp 202.

In an embodiment, when transitioning up in voltage, the system 170, 180 would compare a present voltage to a voltage required for all supported performance states with higher voltage requirements than the present performance state. Then, the system 170, 180 would initiate a processor performance state change when the present voltage is greater than or equal to the next supported performance state voltage as defined on performance state table.

In an embodiment, when transitioning down in voltage, the system 170, 180 may transition by determining when present voltage is substantially equal to a present performance state minimum voltage plus a preset offset voltage and when so, initiating a transition to a next lower voltage performance state. The offset assures that transition occurs before voltage gets below a minimum for the present performance state. As such, this allows a voltage reduction to be continuous.

In an embodiment, when transitioning down in voltage, the system 170, 180 may transition by reducing voltage to a minimum for the present performance state and pause the voltage reduction. Then, the system 170, 180 may initiate a performance state change, wait for it to complete and reduce voltage to the minimum for the new performance state.

In an embodiment, a hardware change from present processor architecture supports transitions to intermediate performance states during ramping of voltage between performance states that have intermediate states. This allows the processor performance to adjust as the voltage slews and gains more performance relative to the higher power dissipation due to the higher voltage. A similar situation exists on transitions from higher performance states to lower ones.

In IHS operating systems software drivers generally perform performance state changes for the processors 102. However, most operating systems do not change faster than about every 50 msec. A slow part of the performance state transition is the voltage slew from one value to another value. To the contrary, frequency changes may take place in a few micro seconds to a few clock cycles. Therefore, it is generally desirable to slew the voltage first and then tell the controller to change the frequency. This can be performed in reverse when transitioning to a lower performance state. In an embodiment, the transition to intermediate performance states is performed by hardware, such as shown in FIG. 5, because the hardware can react faster than software initiated state changes and thus, improves IHS 100 performance. It is a benefit in both desktop and mobile devices to transition to low power as soon as possible to save power. In an embodiment, an operating point may be controlled by the operating system, but during slew times, hardware may be used to ramp the system using intermediate steps following the slew/frequency level at allowable operating points.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS), comprising:
   a processor;
   a voltage regulator coupled to the processor; and
   a performance state optimization system coupled to the processor and the voltage regulator, wherein the performance state optimization system is configured to:
      receive a desired end performance state for the processor, wherein the desired end performance state is associated with an end state minimum voltage;
      determine a plurality of intermediate performance states for the processor, wherein the plurality of intermediate performance states include performance states for the processor that are between a current performance state of the processor and the desired end performance state, and wherein each of the plurality of intermediate performance states are associated with respective intermediate state minimum voltages;
      initiate a voltage reduction of a provided voltage from the voltage regulator to the processor to provide the end state minimum voltage;
      determine that the provided voltage has reached each intermediate state minimum voltage plus an offset voltage using a sub-step timer that provides a first slew time that is required for the provided voltage to reach each intermediate state minimum voltage plus the offset voltage;
      changing the performance state of the processor to each intermediate performance state of the plurality of intermediate performance states in response to determining that the provided voltage has reached each respective intermediate state minimum voltage plus the offset voltage such that the voltage reduction through the plurality of intermediate performance states is continuous;
      determine that the provided voltage has reached the end state minimum voltage plus an offset voltage using the sub-step timer that provides a second slew time that is required for the provided voltage to reach the end state minimum voltage plus the offset voltage; and
      changing the performance state of the processor to the end performance state in response to determining that the provided voltage has reached the end state minimum voltage plus the offset voltage such that the voltage reduction from one of the plurality of intermediate performance states to the end performance state is continuous.

2. The system of claim 1, wherein the plurality of intermediate performance states each include a lower voltage requirement than the current performance state.

3. The system of claim 1, wherein the determining the plurality of intermediate performance states includes using a performance ramp table that details each of the plurality of intermediate performance states that are supported by the processor between the current performance state for the processor and the desired end performance state for the processor.

4. The system of claim 1, wherein the provided voltage from the voltage regular to the processor when the processor is in the current performance state includes a current state voltage.

5. The system of claim 4, wherein the voltage reduction of the provided voltage from the voltage regulator to the processor to provide the end state minimum voltage includes a reduction of the provided voltage from the current state voltage at a first time to the end state minimum voltage at a second time, and wherein the provided voltage includes each respective intermediate state minimum voltage at a plurality of respective third times that are between the first time and the second time.

6. The system of claim 4, wherein the performance state optimization system is further configured to:
compare the current state voltage for the current performance state to each intermediate state minimum voltage for the plurality of intermediate performance states that include lower voltage requirements than the current performance state.

7. The IHS of claim 1, wherein each of the plurality of intermediate performance states are associated with a respective intermediate state processor frequency, and wherein the changing the performance state of the processor to each intermediate performance state of the plurality of intermediate performance states includes changing an operating frequency of the processor to each respective intermediate state processor frequency associated with the plurality of intermediate performance states.

8. An information handling system (IHS), comprising:
a processor;
a voltage regulator coupled to the processor; and
a performance state optimization system coupled to the processor and the voltage regulator, wherein the performance state optimization system is configured to:
receive a desired end performance state for the processor, wherein the desired end performance state is associated with an end state minimum voltage;
determine an intermediate performance state for the processor, wherein the intermediate performance state includes a performance state for the processor that is between a current performance state of the processor and the desired end performance state, and wherein the intermediate performance state is associated with an intermediate state minimum voltage;
initiate a voltage reduction of a provided voltage from the voltage regulator to the processor to provide the end state minimum voltage;
pause the voltage reduction in response to determining that the provided voltage has reached a current state minimum voltage plus an offset voltage using a sub-step timer that provides a slew time that is required for the provided voltage to reach the current state minimum voltage plus the offset voltage, wherein the current state minimum voltage is associated with the current performance state;
change the performance state of the processor to the intermediate performance state in response to determining that the voltage reduction has been paused; and
resume the voltage reduction of the provided voltage in response to determining that the performance state of the processor has reached the intermediate performance state.

9. The system of claim 8, wherein the performance state optimization system is further configured to:
pause the voltage reduction in response to determining that the provided voltage has reached the intermediate state minimum voltage; and
change the performance state of the processor to the end performance state.

10. The system of claim 9, wherein, in response to changing the performance state to the end performance state, the performance state optimization system is further configured to resume the voltage reduction of the provided voltage until the provided voltage reaches the end state minimum voltage.

11. The system of claim 8, wherein the intermediate performance state includes a lower voltage requirement than the current performance state.

12. The system of claim 8, wherein the determining the intermediate performance state includes using a performance ramp table that details the intermediate performance state that is supported by the processor between the current performance state for the processor and the desired end performance state for the processor.

13. The system of claim 8, wherein the intermediate performance state is associated with an intermediate state processor frequency, and wherein the changing the performance state of the processor to the intermediate performance state that is associated with the intermediate state minimum voltage includes changing an operating frequency of the processor to the intermediate state processor frequency that is associated with the intermediate performance state.

14. An information handling system (IHS), comprising:
a processor;
a voltage regulator coupled to the processor; and
a performance state optimization system coupled to the processor and the voltage regulator, wherein the performance state optimization system is configured to:
receive a desired end performance state for the processor, wherein the desired end performance state is associated with an end state minimum voltage;
determine a first intermediate performance state for the processor, wherein the first intermediate performance state includes a performance state for the processor that is between a current performance state of the processor and the desired end performance state, and wherein the first intermediate performance state is associated with a first intermediate state minimum voltage;
initiate a voltage reduction of a provided voltage from the voltage regulator to the processor to provide the end state minimum voltage;
determine that the provided voltage has reached the first intermediate state minimum voltage plus an offset voltage using a sub-step timer that provides a first slew time that is required for the provided voltage to reach the first intermediate state minimum voltage plus the offset voltage;
change the performance state of the processor to the first intermediate performance state in response to determining that the provided voltage has reached the first intermediate state minimum voltage plus the offset voltage;
determine that the provided voltage has reached the end state minimum voltage plus an offset voltage using the sub-step timer that provides a second slew time that is required for the provided voltage to reach the end state minimum voltage plus the offset voltage; and change the performance state of the processor to the end performance state in response to determining that the provided voltage has reached the end state minimum voltage plus the offset voltage.

15. The system of claim 14, wherein the performance state optimization system is further configured to:

determine a second intermediate performance state for the processor, wherein the second intermediate performance state includes a performance state for the processor that is between the current performance state and the desired end performance state, and wherein the second intermediate performance state is associated with a second intermediate state minimum voltage;

determine that the provided voltage has reached the second intermediate state minimum voltage plus an offset voltage using the sub-step timer that provides a third slew time that is required for the provided voltage to reach the second intermediate state minimum voltage plus the offset voltage; and change the performance state of the processor to the second intermediate performance state in response to determining that the provided voltage has reached the second intermediate state minimum voltage plus the offset voltage.

16. The system of claim 15, wherein the voltage reduction is continuous between the current performance state to the end performance state.

17. The system of claim 15, wherein the first intermediate performance state includes a lower voltage requirement than the current performance state, and wherein the second intermediate performance state includes a lower voltage requirement than the first intermediate performance state.

18. The system of claim 15, wherein the determining the first intermediate performance state and the second intermediate performance state includes using a performance ramp table that details each of the first intermediate performance state and the second intermediate performance state that are supported by the processor between the current performance state for the processor and the desired end performance state for the processor.

19. The system of claim 15, wherein the first intermediate performance state is associated with a first intermediate state processor frequency, and wherein the changing the performance state of the processor to the first intermediate performance state that is associated with the first intermediate state minimum voltage includes changing an operating frequency of the processor to the first intermediate state processor frequency that is associated with the first intermediate performance state, and wherein the second intermediate performance state is associated with a second intermediate state processor frequency, and wherein the changing the performance state of the processor to the second intermediate performance state that is associated with the second intermediate state minimum voltage includes changing an operating frequency of the processor to the second intermediate state processor frequency that is associated with the second intermediate performance state.

* * * * *